(12) United States Patent
Lin et al.

(10) Patent No.: US 11,966,255 B2
(45) Date of Patent: Apr. 23, 2024

(54) STRENGTHENED FIXING STRUCTURE AND METHOD FOR ASSEMBLING DISPLAY PANEL THEREWITH

(71) Applicant: Chiun Mai Communication Systems, Inc., New Taipei (TW)

(72) Inventors: Chia-Ju Lin, New Taipei (TW); Fu-Hsin Sung, New Taipei (TW); Meng-Yu Chou, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 73 days.

(21) Appl. No.: 17/584,743

(22) Filed: Jan. 26, 2022

(65) Prior Publication Data

US 2022/0253099 A1    Aug. 11, 2022

(30) Foreign Application Priority Data

Feb. 5, 2021    (CN) .......................... 202110164096.5

(51) Int. Cl.
*G06F 1/16*    (2006.01)
*B25B 11/02*    (2006.01)

(52) U.S. Cl.
CPC ............ *G06F 1/1637* (2013.01); *B25B 11/02* (2013.01)

(58) Field of Classification Search
CPC .................................................. G06F 1/1637
See application file for complete search history.

(56) References Cited

U.S. PATENT DOCUMENTS

| | | | | |
|---|---|---|---|---|
| 6,532,152 B1* | 3/2003 | White | ............... | G02F 1/133308 312/223.1 |
| 7,869,206 B2* | 1/2011 | Dabov | ................. | G06F 1/1656 361/679.55 |
| 8,213,168 B2* | 7/2012 | McClure | ............. | H04M 1/0266 292/216 |
| 8,319,911 B2* | 11/2012 | Dai | ....................... | G06F 1/1626 349/58 |
| 8,971,028 B2* | 3/2015 | McClure | ............... | G06F 1/1626 345/204 |
| 9,310,836 B2* | 4/2016 | Srinivas | ................. | G06F 1/1658 |
| 10,090,877 B2* | 10/2018 | Rayner | ................ | H05K 5/0017 |
| 10,180,702 B2* | 1/2019 | Dabov | ................. | G06F 1/1626 |
| 10,396,843 B2* | 8/2019 | Rayner | ................ | H05K 5/0017 |
| 10,791,644 B2* | 9/2020 | Pakula | ................ | H04M 1/0277 |

(Continued)

FOREIGN PATENT DOCUMENTS

| | | |
|---|---|---|
| CN | 104777652 A | 7/2015 |
| CN | 109291446 A | 2/2019 |
| CN | 111510527 A | 8/2020 |

*Primary Examiner* — Lisa Lea-Edmonds
(74) *Attorney, Agent, or Firm* — ScienBiziP, P.C.

(57) ABSTRACT

A fixing structure used to connect a display panel to a housing of an electronic device during manufacture of the electronic device includes a fixing member, an auxiliary member spaced apart from the fixing member, and supporting posts disposed between the fixing member and the auxiliary member. The fixing member is to be bonded to the display panel. A projection of an outer edge of the auxiliary member on a plane of the fixing member is outside of an outer edge of the fixing member. The supporting posts and the auxiliary member are removed after the display panel is bonded to the fixing member. A method for assembling the display panel with the fixing structure is also disclosed.

10 Claims, 6 Drawing Sheets

(56) References Cited

U.S. PATENT DOCUMENTS

| | | | |
|---|---|---|---|
| 11,604,491 B2 * | 3/2023 | Mathew | H05K 13/00 |
| 11,800,649 B2 * | 10/2023 | Burke | G06F 1/163 |
| 2010/0146766 A1 * | 6/2010 | Dabov | G06F 1/1656 |
| | | | 29/428 |
| 2011/0164370 A1 * | 7/2011 | McClure | H05K 1/0281 |
| | | | 29/592.1 |
| 2011/0164372 A1 * | 7/2011 | McClure | G06F 1/1656 |
| | | | 29/428 |
| 2012/0268882 A1 * | 10/2012 | McClure | G06F 1/1656 |
| | | | 264/294 |
| 2012/0314354 A1 * | 12/2012 | Rayner | G06F 1/1633 |
| | | | 361/679.01 |

* cited by examiner

STRENGTHENED FIXING STRUCTURE AND METHOD FOR ASSEMBLING DISPLAY PANEL THEREWITH

FIELD

The subject matter relates to display panels, and more particularly, to a strengthened fixing structure and a method for assembling a display panel with the fixing structure.

BACKGROUND

Electronic devices, such as mobile phones, may include display devices. The display device includes a display panel and a fixing member surrounding the display panel. The fixing member is used to support and protect the display panel. During assembly of the display panel with the fixing member, glue is first applied on the fixing member by a glue dispensing device. Then, the fixing member with the glue is placed in a pasting device, which assembles the fixing member with the display panel.

However, the fixing member is a single-layer structure, and is not strong, the fixing member is easily deformed during the gluing process and the assembling process. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
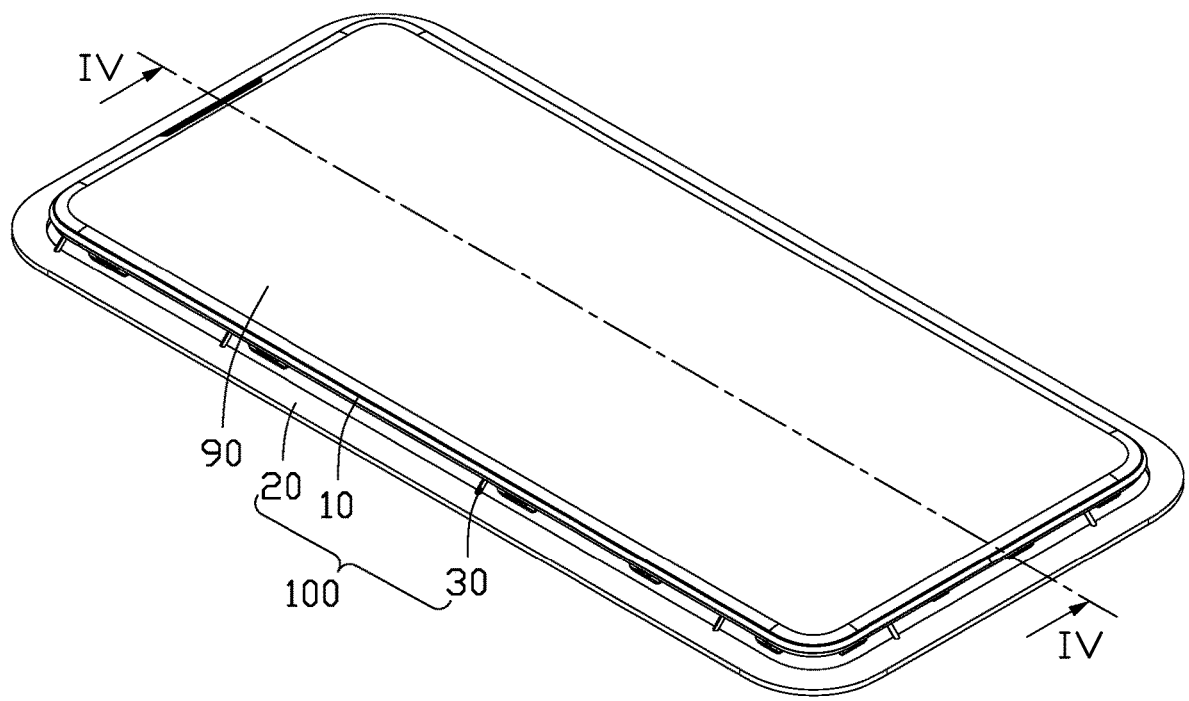
FIG. 1 is a diagrammatic view of a display panel bonded with a fixing structure according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant characteristic being described. Also, the description is not to be considered as limiting the scope of the embodiments described herein. The drawings are not necessarily to scale, and the proportions of certain parts may be exaggerated to better illustrate details and characteristics of the present disclosure.

The term "comprising," when utilized, means "including, but not necessarily limited to"; it specifically indicates open-ended inclusion or membership in the so-described combination, group, series, and the like.

Figure 5:
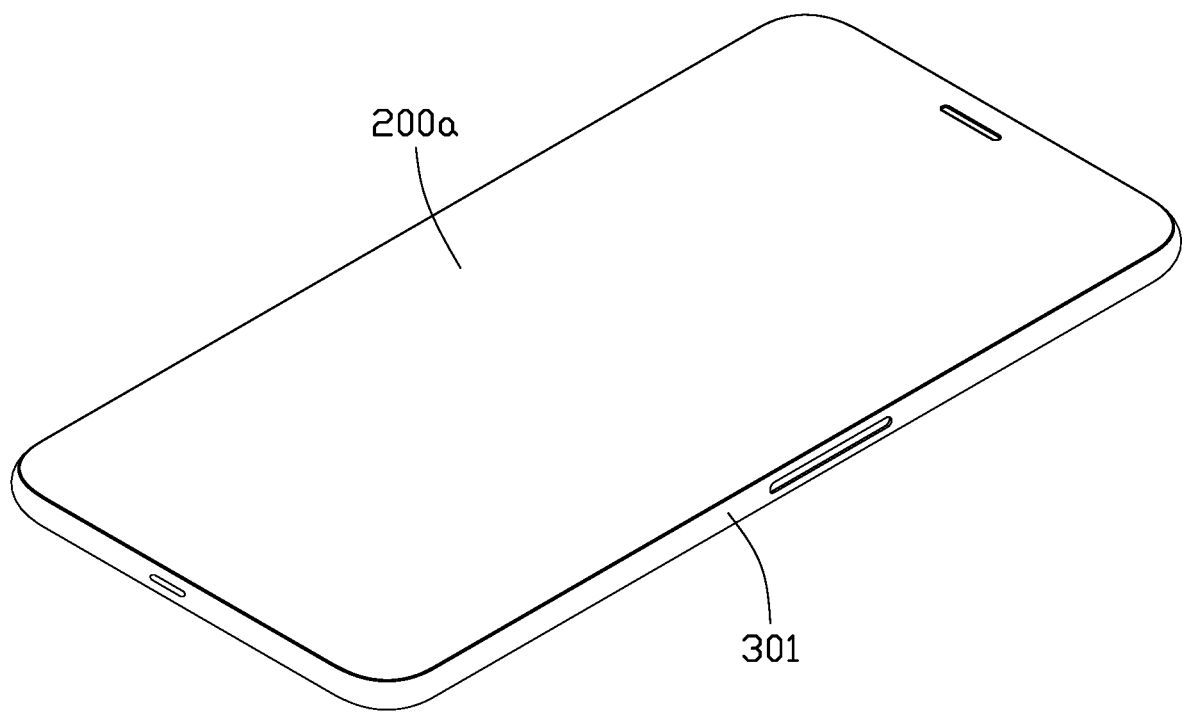
FIG. 5 is a diagrammatic view of an electronic device according to the present disclosure

FIG. 1 illustrates an embodiment of a connecting structure 200, which incudes a fixing structure 100 and a display panel 90 fixed on the fixing structure 100. Referring to FIG. 5, the fixing structure 100 is used to connect the display panel 90 to a housing 301 of an electronic device 300. The electronic device 300 may be, but is not limited to, a mobile phone.

Figure 2:
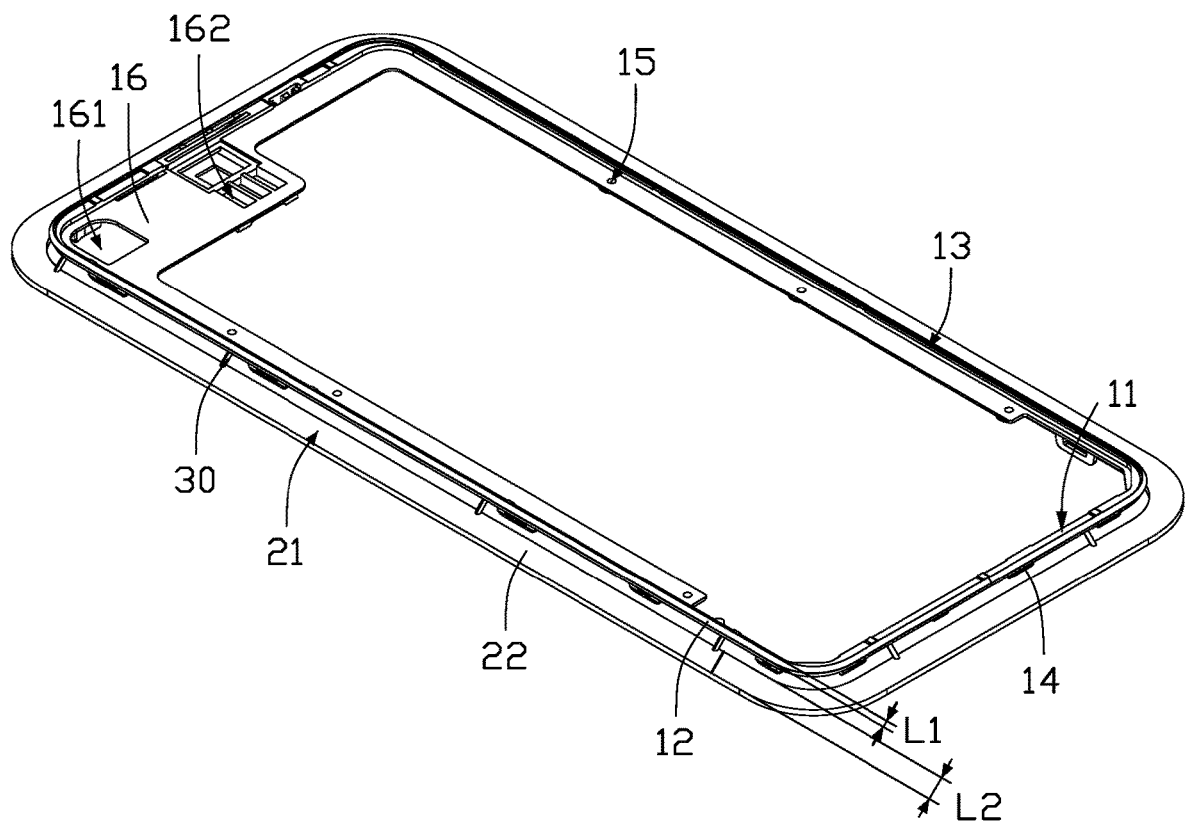
FIG. 2 is a diagrammatic view of the fixing structure of FIG. 1.
Figure 3:
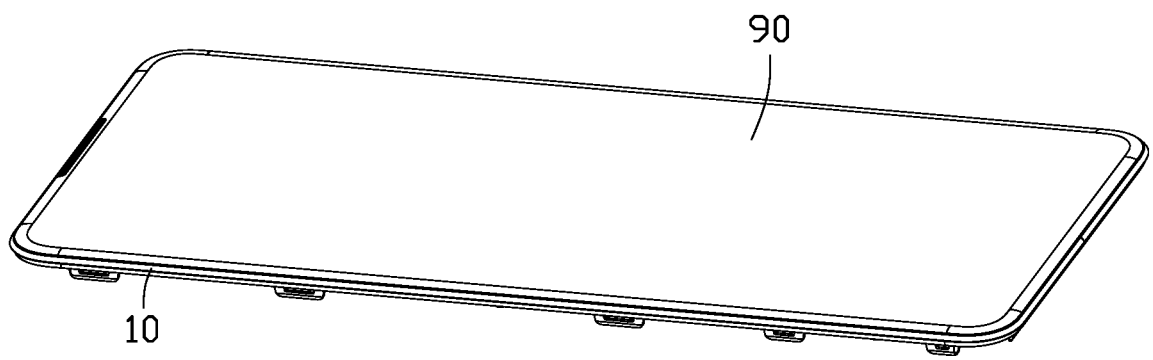
FIG. 3 is a diagrammatic view of display device of FIG. 1 after supporting posts and an auxiliary member are removed.

Referring to FIGS. 1 and 2, the fixing structure 100 includes a fixing member 10, an auxiliary member 20, and a plurality of supporting posts 30. The fixing member 10 is to be bonded to the display panel 90. The auxiliary member 20 is spaced apart from the fixing member 10. An outer edge of the auxiliary member 20 protrudes out from an outer edge of the fixing member 10. The supporting posts 30 are connected between the fixing member 10 and the auxiliary member 20. The display panel 90 is bonded to the fixing member 10 to obtain the connecting structure 200. Referring to FIG. 3, the supporting posts 30 and the auxiliary member 20 are removed from the connecting structure 200 after the display panel 90 is bonded to the fixing member 10, to obtain a display device 200a. Then, the display device 200a is placed in the housing 301 of the electronic device 300 (see FIG. 5).

In use of the fixing structure 100, a user can apply a glue on the fixing member 10. Then, the fixing member 10 with the glue is aligned with and bonded to the display panel 90 to obtain the connecting structure 200. Finally, the supporting posts 30 and the auxiliary member 20 are removed from the connecting structure 200 to obtain the display device 200a.

In an embodiment, the supporting posts 30 and the auxiliary member 20 are made of recycled materials. After the supporting posts 30 and the auxiliary member 20 are removed, the supporting posts 30 and the auxiliary member 20 can be used again, reducing a cost.

When the glue is applied onto the fixing member 10 or when the display panel 90 is bonded to the fixing member 10, a pressing force applied on the fixing member 10 is transmitted to the auxiliary member 20 through the supporting posts 30. That is, the auxiliary member 20 disperses the pressing force applied on the fixing member 10 to avoid deformation of the fixing member 10, thus the strength of the fixing member 10 is not overcome during manufacture. The outer edge of the auxiliary member 20 protrudes from the outer edge of the fixing member 10. That is, a projection of an outer edge of the auxiliary member 20 on a plane of the fixing member 10 is outside of an outer edge of the fixing member 10, so as to increase area which is stressed on the auxiliary member 20. Thus, positioning and connection between the auxiliary member 20 and an assembly device (not shown) are facilitated. The positioning of the fixing member 10 in the assembly device is also facilitated. The auxiliary member 20 also disperses the pressing force transmitted to the auxiliary member 20, and further improves the instant strength of the fixing member 10. The supporting posts 30 and the auxiliary member 20 are then removed from the connecting structure 200, which facilitates the assembly of the fixing member 10 with the display panel 90 in the housing 301 of the electronic device 300.

Referring to FIG. 2, the fixing member 10 in the fixing structure 100 includes a first supporting surface 11. The first supporting surface 11 is used to support an edge of the back surface of the display panel 90. The auxiliary member 20 includes a second supporting surface 21. The second supporting surface 21 is used to support the supporting posts 30. The first supporting surface 11 is parallel to the second supporting surface 21, so that a pressing force on the first supporting surface 11 is evenly transmitted to the second supporting surface 21. A surface area of the second supporting surface 21 is larger than a surface area of the first supporting surface 11, which disperses the pressing force over the second supporting surface 21 to improve the strength of the fixing member 10.

In an embodiment, an included angle is formed between the axial direction of each of the supporting posts 30 and the second supporting surface 21. The included angles of the axial directions of the supporting posts 30 and the second supporting surface 21 are equal to each other, stabilizing the supporting posts 30 between the fixing member 10 and the auxiliary member 20. In an embodiment, the axial direction of each of the supporting posts 30 is inclined in relation to the second supporting surface 21. The included angle can be 30 degrees, 45 degrees, 60 degrees, or 75 degrees. Every two supporting posts 30 form a group, the two supporting posts 30 in each group are opposite to each other. A distance between adjacent groups of the supporting posts 30 gradually reduces along a direction from the auxiliary member 20 to the fixing member 10 to form a trapezoidal structure, so as to improve stability. In another embodiment, the included angle is 90 degrees.

In the fixing structure 100, the first supporting surface 11 is parallel to the second supporting surface 21, so that the pressing force on the first supporting surface 11 is evenly transmitted to the second supporting surface 21, so as to avoid the deformation of the fixing member 10 during assembly process. The included angles are equal to each other, which improves the stability of the supporting posts 30 between the fixing member 10 and the auxiliary member 20.

Referring to FIG. 2, the fixing member 10 includes a plurality of first sides 12 interconnected with each other. Each first side 12 extends along the outer edge of the display panel 90. An inner edge of the first side 12 for supporting the display panel 90 defines a first supporting surface 11, so that the display panel 90 can be bonded to edges of the first sides 12 to improve tightness and soundness of the connection between the fixing member 10 and the display panel 90. The auxiliary member 20 includes a plurality of second sides 22 interconnected with each other. Each second side 22 corresponds to a first side 12, and an extending direction of the second side 22 is parallel with that of the first side 12. The second sides 22 cooperatively defines the second supporting surface 21 for supporting the supporting posts 30. The second sides 22 evenly transfer the pressing force from the first supporting surface 11 to the second supporting surface 21, and avoid deformation of the fixing member 10 during the assembly process. The strength of the fixing member 10 during manufacture is not compromised.

In an embodiment, the display panel 90 is rectangular. The first sides 12 form a rectangle. The second sides 22 form another rectangle protruding out from the first sides 12. In another embodiment, the display panel 90 is circular, polygonal, or irregular. Accordingly, the first sides 12 form a shape suitable to housing the display panel 90, and the second sides 22 form a shape the same as that of the first sides 12.

A length of the first side 12 perpendicular to its extension direction is defined as a first width L1. A length of the second side 22 perpendicular to its extension direction is defined as a second width L2. The second length L2 is larger than the first length L1, so that a surface area of the second side 22 is greater than a surface area of the first side 12. A stressed area of the auxiliary member 20 is larger than that of the fixing member 10, so that the auxiliary member 20 can disperse the pressing force from the fixing member 10.

In an embodiment, the two supporting posts 30 in each group are symmetrical to each other along the axial direction of the fixing member 10. The pressing force on the fixing member 10 is evenly transmitted to the auxiliary member 20, so as to avoid deformation of the fixing member 10 during the assembly process, and the strength of the fixing member 10 can be improved. The first sides 12 of the fixing member 10 cooperatively form a rectangle. The fixing member 10 defines a length axis and a width axis in the rectangle. Among the multiple groups of supporting posts 30, some groups of the supporting posts 30 are symmetrical to each other along the length axis of the fixing member 10, and the other groups of supporting posts 30 are symmetrical to each other along the width axis of the fixing member 10.

In another embodiment, the first sides 12 of the fixing member 10 cooperatively form an irregular shape. When an axis of the irregular shape cannot be easily determined, the supporting posts 30 will be disposed between the first sides 12 and the second sides 22 at equal intervals. Thus, the pressing force on the fixing member 10 is evenly transmitted to the auxiliary member 20 to avoid deformation of the fixing member 10 during the assembly process. And the auxiliary member 20 can further improve the strength of the fixing member 10.

Each first side 12 of the fixing structure 100 extends along the outer edge of the display panel 90 to improve the tightness and precision of the connection between the fixing member 10 and the display panel 90. The second side 22 corresponds to a first side 12, and an extending direction of the second side 22 is the same as that of the first side 12. The supporting posts 30 are positioned symmetrically to each other along the axial direction of the fixing member 10. The second sides 22 evenly transfer the pressing force from the first supporting surface 11 to the second supporting surface 21 and avoid deformation of the fixing member 10 during the assembly process. The strength of the fixing member 10 is further improved. The second length L2 is longer than the first length L1, so that a surface area of the second side 22 is greater than a surface area of the first side 12. A stressed area of the auxiliary member 20 is larger than that of the fixing member 10, so that the auxiliary member 20 can disperse the pressing force from the fixing member 10.

Figure 4:
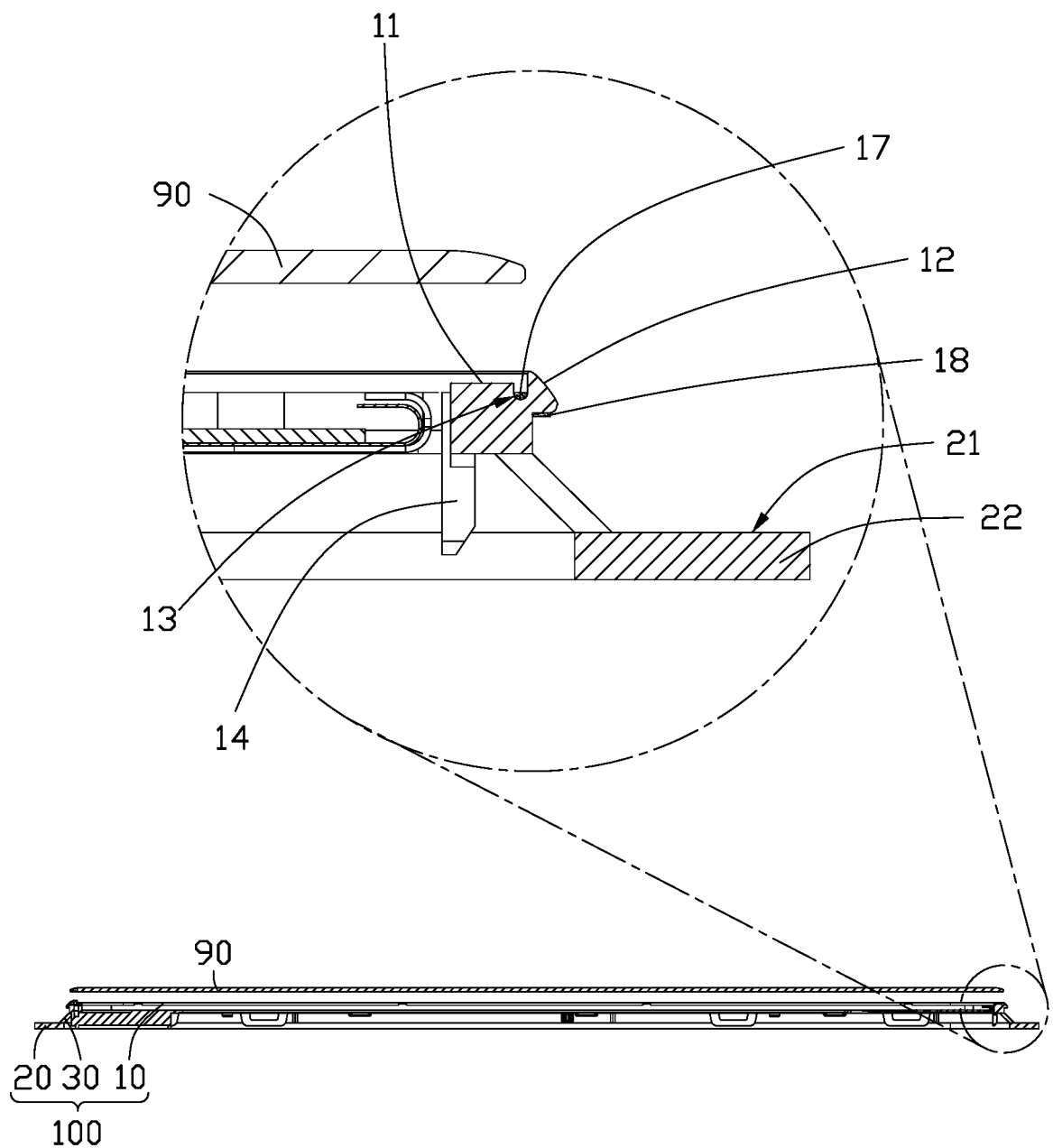
FIG. 4 is a cross-sectional view taken along line IV-IV in FIG. 1.

Referring to FIGS. 2 and 4, the first supporting surface 11 of the fixing member 10 defines a receiving groove 13. The receiving groove 13 annularly extends along the outer edge of the display panel 90. The fixing member 10 also includes a plurality of fasteners 14. The fasteners 14 are disposed on a surface of the fixing member 10 away from the display panel 90. The fasteners 14 can engage with the housing 301 of the electronic device 300 after removing the supporting posts 30 and the auxiliary member 20 (referring to FIG. 5). In an embodiment, the receiving groove 13 is defined on surfaces of the first sides 12 facing the display panel 90. The fasteners 14 are disposed on surfaces of the first sides 12 away from the display panel 90.

Figure 6:
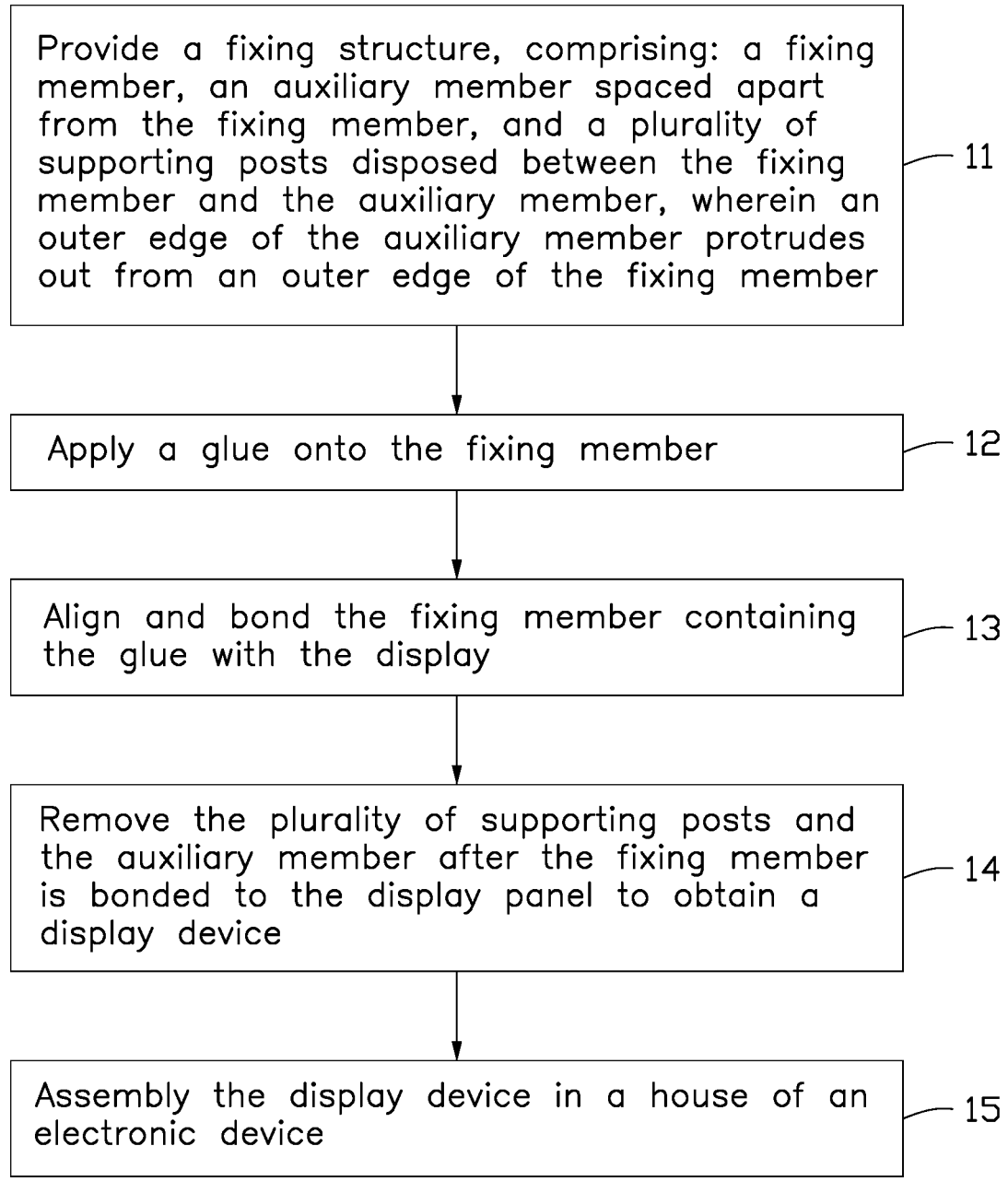
FIG. 6 is a flowchart of a method for assembling the display panel in a fixing structure according to the present disclosure.

Referring to FIGS. 4 and 6, the receiving groove 13 is coated with a first adhesive layer 17. The surface of the fixing member 10 away from the display panel 90 is coated with a second adhesive layer 18. The first adhesive layer 17 is applied to the display panel 90. The second adhesive layer 18 is applied to the housing 301 of the electronic device 300. The first adhesive layer 17 can improve the tightness of the connection between the fixing member 10 and the display panel 90, and the second adhesive layer 18 can improve the tightness of the connection between the fixing member 10 and the housing 301 of the electronic device 300.

In an embodiment, referring to FIGS. 2 and 6, the fixing member 10 also defines a positioning hole 15. The positioning hole 15 is for positioning and connecting with the housing 301 of the electronic device 300 to improve the tightness of the connection between the fixing member 10 and the housing 301 of the electronic device 300.

In an embodiment, referring to FIG. 2, the fixing member 10 also includes a connecting plate 16. The connecting plate 16 connects to the first sides 12 and extends towards an inner part of the first sides 12. The connecting plate 16 defines a mounting hole 161 and a mounting groove 162. The mounting hole 161 and the mounting groove 162 receive components of the display panel 90.

The first adhesive layer 17 in the receiving groove 13 and the second adhesive layer 18 on the surface of the fixing member 10, in combination with the fasteners 14 disposed on the surface of the fixing member 10, can improve the tightness of the connection between the fixing member 10 and the display panel 90, and the tightness of the connection between the fixing member 10 and the housing 301 of the electronic device 300.

With the above configuration, the pressing force applied on the fixing member 10 is transmitted to the auxiliary member 20 through the supporting posts 30. The auxiliary member 20 is used to disperse the pressing force applied on the fixing member 10 and avoid deformation of the fixing member 10 during the assembly process. The strength of the fixing member 10 and the product yield can be also improved. The outer edge of the auxiliary member 20 protrudes out from the outer edge of the fixing member 10, resulting in a larger stressed area of the auxiliary member 20, so that the auxiliary member 20 can disperse the pressing force from the fixing member 10. Positioning and connecting between the auxiliary member 20 and the assembly device are facilitated. The positioning of the fixing member 10 in the assembly device is also facilitated. After the display panel 90 is bonded to the fixing member 10, the supporting posts 30 and the auxiliary member 20 are removed from the connecting structure 200, for assembly of the display device 200a on the housing 301 of the electronic device 300.

FIG. 6 illustrates an embodiment of a method for assembling the display panel 90 on the fixing structure 100 to achieve the second connecting structure 200a. The method is provided by way of embodiment, as there are a variety of ways to carry out the method. The method can begin at block 11.

At block 11, the fixing structure 100 is provided.

At block 12, a glue onto the fixing member 10 of the fixing structure 100 is applied.

The fixing member 10 of the fixing structure 100 is placed in the glue dispensing device. The first adhesive layer 17 can be applied in the receiving groove 13. The second adhesive layer 18 can be applied on the surface of the fixing member 10 away from the display panel 90. The auxiliary member 20 of the fixing structure 100 is positioned and connected to the assembly device to facilitate the positioning of the fixing member 10 in the assembly device, and prevent the glue dispensing device from directly contacting with the fixing member 10 to damage of the fixing member 10. The pressing force of the glue dispensing device on the fixing member 10 is transmitted to the auxiliary member 20 through the supporting posts 30 to avoid the deformation of the fixing member 10 during the gluing process, which can improve the strength of the fixing member 10.

At block 13, the fixing member 10 containing the glue is aligned and bonded with the display panel 90.

The fixing member 10 containing the first adhesive layer 17 and the second adhesive layer 18 is placed in the bonding device and bonded with the display panel 90. The fixing member 10 is aligned and bonded with the display panel 90 to obtain the connecting structure 200. The auxiliary member 20 is positioned and connected with the bonding device to facilitate the positioning of the fixing member 10 in the bonding device and prevent the bonding device from directly contacting with the fixing member 10 to damage the fixing member 10.

In another embodiment, a joint portion between the fixing member 10 and the display panel 90 is adsorbed by a pressure maintaining device. By adsorption of the pressure maintaining device the fixing member 10 and the display panel 90 can tightly bonded to each other.

At block 14, the supporting posts 30 and the auxiliary member 20 are removed after the fixing member 10 is bonded to the display panel.

The supporting posts 30 and the auxiliary member 20 are removed from the connecting structure 200 after the fixing member 10 is bonded to the display panel 90 to obtain the display device 200a.

In an embodiment, the supporting posts 30 and the auxiliary member 20 in the fixing structure 100 are removed by cutting with a laser cutting device or manual cutting means.

In another embodiment, a pre breaking groove is defined between the supporting posts 30 and the fixing member 10. The fixing member 10 and the supporting posts 30 are separated through the pre breaking groove after the display panel 90 is bonded to the fixing member 10.

After obtaining the display device 200a, the method of assembling the display panel 90 further includes a block 15.

At block 15, the display device 200a is assembled in the housing 301 of the electronic device 300.

When the glue is applied to the fixing member 10 or when the display panel 90 is bonded to the fixing member 10, a pressing force applied on the fixing member 10 is transmitted to the auxiliary member 20 through the supporting posts 30. That is, the auxiliary member 20 is used to disperse the pressing force applied on the fixing member 10 to avoid deformation of the fixing member 10, and thus the strength of the fixing member 10 and the product yield are improved. After the display panel 90 is bonded to the fixing member 10, the supporting posts 30 and the auxiliary member 20 are removed from the connecting structure 200 to facilitate the assembly of the display device 200a in the housing 301 of the electronic device 300.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including, the full extent established by the broad general meaning of the terms used in the claims.

What is claimed is:

1. A fixing structure configured to connect a display panel to a housing of an electronic device, the fixing structure comprising:
    a fixing member configured to be bonded to the display panel;

an auxiliary member spaced apart from the fixing member, wherein a projection of an outer edge of the auxiliary member on a plane of the fixing member is outside of an outer edge of the fixing member; and a plurality of supporting posts disposed between the fixing member and the auxiliary member, wherein each of the plurality of supporting posts and the auxiliary member is configured to be removed after the display panel is bonded to the fixing member.

2. The fixing structure of claim 1, wherein
the fixing member comprises a first supporting surface, the first supporting surface is configured to support an edge of a back surface of the display panel;
the auxiliary member comprises a second supporting surface, and the second supporting surface is configured to support the plurality of supporting posts.

3. The fixing structure of claim 2, wherein the first supporting surface is parallel to the second supporting surface.

4. The fixing structure of claim 2, wherein a surface area of the second supporting surface is larger than a surface area of the first supporting surface.

5. The fixing structure of claim 1, wherein
the fixing member comprises a plurality of first sides interconnected with each other, each of the plurality of first sides extends along an outer edge of the display panel;
the auxiliary member comprises a plurality of second sides interconnected with each other, each of the plurality of second sides corresponds to a corresponding one of the plurality of first sides, an extending direction of each of the plurality of second sides is parallel with an extending direction of the corresponding one of the plurality of first sides.

6. The fixing structure of claim 5, wherein a second width (L2) of each of the plurality of second sides is longer than a first width (L1) of the corresponding one of the plurality of first sides, wherein the first width (L1) is a length of each of the plurality of first sides perpendicular to its extension direction, the second width (L2) is a length of each of the plurality of second sides perpendicular to its extension direction.

7. The fixing structure of claim 1, wherein two of the plurality of supporting posts are positioned symmetrically to each other along an axial direction of the fixing member.

8. The fixing structure of claim 2, wherein the first supporting surface of the fixing member defines a receiving groove, the receiving groove annularly extends along an outer edge of the display panel.

9. The fixing structure of claim 1, wherein the fixing member further comprises a plurality of fasteners, the plurality of fasteners is disposed on a surface of the fixing member away from the display panel, the plurality of fasteners is configured to connect to the housing of the electronic device after the plurality of supporting posts and the auxiliary member are removed.

10. The fixing structure of claim 9, wherein
each of the receiving groove is coated with a first adhesive layer,
the surface of the fixing member away from the display panel is coated with a second adhesive layer, the first adhesive layer is configured to connect to the display panel, the second adhesive layer is configured to connect to the housing.

* * * * *